United States Patent [19]

Hunsinger et al.

[11] Patent Number: 5,278,933
[45] Date of Patent: Jan. 11, 1994

[54] FIBER OPTIC SPLICE ORGANIZER AND ASSOCIATED METHOD

[76] Inventors: Terrance D. Hunsinger, 1413 Sitterson Dr., Raleigh, N.C. 27603; Craig D. Ray, 5611-307 Briar Oak La., Raleigh, N.C. 27612

[21] Appl. No.: 906,804

[22] Filed: Jun. 30, 1992

[51] Int. Cl.$^5$ .......................... G02B 6/26; B65D 85/38
[52] U.S. Cl. ..................................... 385/135; 385/134; 385/95; 385/98; 206/316.1
[58] Field of Search ............... 385/135, 134, 136, 137, 385/114, 100, 95, 97, 98; 206/557, 558, 564, 565, 316.1

[56] References Cited

U.S. PATENT DOCUMENTS

| | | | |
|---|---|---|---|
| 4,266,853 | 5/1981 | Hutchins et al. | 385/135 X |
| 4,359,262 | 11/1982 | Dolan | 385/135 X |
| 4,428,645 | 1/1984 | Korbelak et al. | 385/135 X |
| 4,500,166 | 2/1985 | Kunze | 385/135 X |
| 4,619,499 | 10/1986 | Gerber | 385/135 X |
| 4,679,896 | 7/1987 | Krafcik et al. | 385/135 X |
| 4,687,289 | 8/1987 | De Santi | 385/135 X |
| 4,753,499 | 6/1988 | Malkani et al. | 385/135 X |
| 4,765,709 | 8/1988 | Suillerot et al. | 385/135 X |
| 4,805,979 | 2/1989 | Bossard et al. | 385/135 X |
| 4,812,004 | 3/1989 | Biederstedt et al. | 385/135 X |
| 4,840,449 | 6/1989 | Ghandeharizadeh | 385/135 X |
| 4,886,336 | 12/1989 | Deusser et al. | 385/135 X |
| 4,898,448 | 2/1990 | Cooper | 385/135 X |
| 4,913,522 | 4/1990 | Nolf et al. | 385/135 X |
| 5,090,792 | 2/1992 | Koht et al. | 385/135 X |
| 5,093,886 | 3/1992 | Smoker et al. | 385/135 |
| 5,097,529 | 3/1992 | Cobb et al. | 385/135 |
| 5,131,066 | 7/1992 | Foss | 385/135 |
| 5,167,001 | 11/1992 | Debortoli et al. | 385/135 |
| 5,187,766 | 2/1993 | Finzel et al. | 385/135 |
| 5,206,927 | 4/1993 | Finzel et al. | 385/135 |
| 5,208,894 | 5/1993 | Johnson | 385/135 |
| 5,212,761 | 5/1993 | Petrunia | 385/135 |

FOREIGN PATENT DOCUMENTS

| | | | |
|---|---|---|---|
| 2735106A1 | 2/1979 | Fed. Rep. of Germany | 385/135 X |
| 371028C1 | 7/1988 | Fed. Rep. of Germany | 385/135 X |
| 3706518A1 | 9/1988 | Fed. Rep. of Germany | 385/135 X |
| 2363243 | 3/1976 | France | 385/135 X |
| 55-45053 | 3/1980 | Japan | 385/135 X |
| 58-221818 | 12/1983 | Japan | 385/135 X |
| 61-188508 | 8/1986 | Japan | 385/135 X |
| 2150313A | 6/1985 | United Kingdom | 385/135 X |
| WO9015351 | 12/1990 | World Int. Prop. O. | 385/135 X |

OTHER PUBLICATIONS

Raychem Corporation Telecommunication Division, 1986, Brochure Entitled: "FOSC 100 Fiber-Optic Splice Closure System".

Siecor Corporation, 1987, 1988, Catalog Entitled: "The Fiber Optic Catalog Fiber Optic Components of the Universal Transport System".

Primary Examiner—Brian Healy
Attorney, Agent, or Firm—Herbert G. Burkard; William D. Zahrt, II

[57] ABSTRACT

A fiber optic splice organizer for storing optical fiber splices and the slack associated therewith to permit ready separation of the optical fibers, such as to remake a splice. The splice organizer includes a generally rectangular base, splice securing slots on the base, and optical fiber guides for guiding slack portions of first and second optical fiber groups from a first end of the base, along respective portions of the base adjacent the first and second sides thereof, into a plurality of overlying slack loops adjacent the second end of the base, and back to the splice securing means from respective first and second sides of the base. The slack optical fibers, including the overlying respective slack loop, of the first and second optical fiber groups, form a figure-eight pattern on the base and are thus readily separable from each other. An ability to interconnect individual optical fibers broken out from optical fiber ribbons is also provided by crossing first and second groups of optical fiber ribbons and breaking out individual optical fibers at the crossover point. Arcuately shaped walls on the base are provided to maintain the individual fibers in a predetermined bend radius. A series of tabs along sidewalls of the base separate the individual fibers from the optical fiber ribbons downstream from the crossover point.

34 Claims, 7 Drawing Sheets

FIBER BUNDLES ENTER

FIBER OPTIC SPLICE ORGANIZER AND ASSOCIATED METHOD

FIELD OF THE INVENTION

The invention relates to the field of fiber optics and, more particularly, to the storage and organization of fiber optic splices and associated slack.

BACKGROUND OF THE INVENTION

Optical fiber communications systems are used extensively in the telecommunications industry due to their large information carrying capacity, their virtually noise-free performance, and the long span distances achievable with optical fibers before regeneration and amplification of the signal is required. Practical limits on the lengths of optical fiber cables that can be manufactured and installed typically require that many splice points be included over the total cable route.

At each splice location, the optical fibers are separated from

The invention relates to the field of fiber optics and, more particularly, to the storage and organization of fiber optic splices and associated slack.

BACKGROUND OF THE INVENTION

Optical fiber communications systems are used extensively in the telecommunications industry due to their large information carrying capacity, their virtually noise-free performance, and the long span distances achievable with optical fibers before regeneration and amplification of the signal is required. Practical limits on the lengths of optical fiber cables that can be manufactured and installed typically require that many splice points be included over the total cable route.

At each splice location, the optical fibers are separated from the other protective cable components for splicing and are, thus, more susceptible to damage. In addition, the optical fibers at a splice point are handled by a technician who must splice the fibers and then store the splice and associated slack in a protective enclosure.

Accordingly, enclosures for protecting optical fiber splices have been developed and are readily available. Typically, these enclosures include one or more splice organizers, or splice trays, on which the individual splices and associated slack are mounted. For example, the assignee of the present invention manufactures a conventional splice enclosure and splice organizer under the model designation FOSC 100. Siecor Corporation of Hickory, N.C. makes splice enclosures under the model designations SC2, and SC4-6. Another splice enclosure is shown in UK Patent Application No. 2,150,313A assigned to Preformed Line Products of Cleveland, Ohio.

A splice organizer is typically limited in the amount of space it may occupy although it must permit the mounting of the individual splices and permit storage of the slack optical fibers in a relatively neat configuration. To hold a sufficient amount of slack to permit splicing, a splice organizer typically accommodates one or more bends of slack optical fiber in slack loops that cannot be sharply bent and thereby exceed the minimum bend radius for the optical fiber. Exceeding the bend radius causes microbending losses, that is, increased attenuation of the optical signal. In addition, the optical fibers may be physically damaged by exceeding the minimum bend radius. An approach to storing a sufficient length of slack, is to use multiple loops for each individual fiber. See, for example, U.S. Pat. No. 4,373,776, to Purdy, and U.S. Pat. No. 4,765,709 to Suillerot et al.

The slack loops of conventional splice organizers are frequently permanently entangled with each other as part of the normal course of splicing and routing of the slack for storage on the splice organizer. Unfortunately, it is very difficult to access an individual splice after all of the splices have been completed because of the entangling of the slack optical fibers. In almost all fiber optic communications systems, it is critical that high quality and high reliability splices be obtained. Fusion and mechanical splicing techniques and equipment have been developed that permit low loss, high quality, and durable splices to be obtained. However, it may sometimes be necessary to remake or repair splices to achieve the desired splice quality. The inability to readily reaccess a splice, such as to remake the splice, is a significant shortcoming of conventional fiber optic splice organizers.

Fiber cables are also available of a ribbon type, such as manufactured by AT&T, wherein several optical fibers are arranged in side-by-side relation and secured together by an adhesive layer. However, another difficulty with conventional splice organizers and techniques is that organizers for ribbon-type fiber optic cables require that every fiber in a given ribbon be spliced to every correspondingly positioned fiber of another fiber optic ribbon. Thus, any flexibility in interconnecting a predetermined individual optical fiber to an optical fiber in a different position or on a different ribbon is simply not available. Moreover, should it be necessary to repair only a single optical fiber splice of the ribbon, all of the splices must then be broken and remade. Thus, unnecessary communications system downtime is experienced because of the need to work with all of the fibers in the ribbon, rather than being able to efficiently access only one optical fiber from the ribbon.

In many new fiber optic communications applications, such as in campus-type networks or cable TV networks, high fiber counts and a large number of drop points are required. Unfortunately, since conventional fiber optic organizers cannot accommodate splices between individual optical fibers when ribbon cables are used, interconnection flexibility for such a system is severely limited.

OBJECTS AND SUMMARY OF THE INVENTION

In view of the foregoing background, it is therefore an object of the present invention to provide a splice organizer and method for securing optical fiber splices and slack associated therewith that also permits ready separation of the optical fibers even after all of the splices have been completed, such as to facilitate remaking a splice.

Another object of the invention is to provide a splice organizer and method for optical fiber ribbons which permits the break out and splicing of individual optical fibers from the ribbons to enhance interconnection flexibility and to permit the repair of individual optical fibers from an optical fiber ribbon.

These and other objects, advantages and features according to the invention are provided by a splice organizer including a generally rectangular base, splice securing means on the base, and slack guide means on the base for guiding respective slack portions of first and second optical fiber groups from a first end of the base, along respective portions of the base adjacent the first and second sides thereof, into a plurality of overlying slack loops adjacent the second end of the base, and back to the splice securing means from respective first and second sides of the base. The slack, including the overlying respective slack loops of the first and second optical fiber groups, form a figure-eight pattern on the base and are thus readily separable from each other. Accordingly, splices between optical fibers in high fiber count cables can be readily accommodated, and, if necessary, a single splice and its associated slack may be readily separated from the others, such as to permit remaking a defective splice. Ribbon optical fiber cables are also advantageously used with the splice organizer.

The splice organizer may be adapted for an in-line splice or a butt splice. As would be readily understood by those skilled in the art, for an in-line splice the two optical fiber cables are secured to opposite ends of the base and the routing of the overlying slack loops are the same as for the butt splice.

The slack guide means for the splice organizer preferably includes first and second pairs of laterally spaced apart optical fiber guides positioned adjacent respective first and second sides of the base. Each of these first and second pairs of optical fiber guides includes first and second optical fiber guides, wherein the first optical fiber guide of each pair is positioned on a medial portion of the base between the first and second ends thereof and the second optical fiber guide of each pair is positioned adjacent the second end of the base. Each of the optical fiber guides is preferably formed by a pair of opposing spaced apart walls extending upwardly from the base. An additional pair of laterally spaced apart optical fiber guides and associated fasteners are preferably provided adjacent the first end of the base and further serve to hold the optical fiber groups to the base.

The splice securing means is preferably provided by a series of laterally spaced apart walls extending upwardly from the base. The spaced apart walls thereby define a series of widthwise extending slots for receiving conventional optical fiber splices therein.

A further aspect of the present invention is the ability to permit interconnecting predetermined individual optical fibers broken out from groups of optical fiber ribbons or to repair an individual optical fiber in a ribbon. An optical fiber ribbon typically contains four, six, twelve or more, side-by-side optical fibers secured together by an adhesive layer. Optical fiber ribbons are typically spliced as a unit; however, the present invention permits individual fibers to be broken out from the ribbons to be repaired, or to be spliced to other optical fibers either in a different position or on another ribbon. Thus, the invention provides greater flexibility in interconnecting ribbon optical fiber cables and facilitates the repair of individual optical fibers in optical fiber ribbons.

The ability to interconnect and splice individual optical fibers is provided by breakout means positioned on the base for securing the first and second optical fiber ribbon groups and for guiding predetermined individual optical fibers broken out from optical fiber ribbons away from the ribbons for effecting individual splices. The breakout means for the butt splice embodiment of the invention includes crossover means positioned adjacent the first end of the base for guiding the first and second optical fiber ribbon groups in a crossing relation to positions adjacent respective opposing sides of the base. The crossover means includes the pair of laterally spaced apart optical fiber ribbon guides and fasteners forming the optical fiber group securing means described above for holding the optical fiber groups in place on the base. The optical fiber ribbon groups are brought along the underside of the base and in crossing relation at the first end of the base to the upper surface of the base.

The individual fibers are broken out from the ribbons at the crossing point and guided along first and second arcuately shaped walls positioned on the base adjacent respective optical fiber ribbon guides. The arcuately shaped walls each have a predetermined radius of curvature for maintaining the individual optical fibers at a predetermined minimum bend radius. As would be readily understood by those skilled in the art, exceeding the minimum bend radius of an optical fiber causes undesirable microbending losses for the optical signal carried by the optical fiber and jeopardizes the physical integrity of the optical fiber groups.

Separator means for maintaining the individual optical fibers separate from the first and second optical fiber ribbon groups is provided downstream from the breakout means. The separator means is provided by first and second channels on the base extending lengthwise adjacent respective first and second sides of said base for receiving therein slack portions of the predetermined individual optical fibers. A generally widthwise extending arcuately shaped wall, having a predetermined radius of curvature, is also positioned on the base adjacent the second end thereof to maintain the individual optical fibers and ribbons separated.

The method according to the present invention for organizing optical fiber splices and their associated slack includes the steps of guiding and securing respective slack portions of first and second optical fiber groups from the first end of the base, along respective portions of the base adjacent the first and second sides thereof, into a plurality of overlying slack loops adjacent the second end of said base, and back to adjacent the first end of the base from respective first and second sides of the base. The optical fiber splices are then secured on a medial portion of the base adjacent the first end thereof.

A method according to the present invention for splicing optical fiber ribbon groups includes the steps of breaking out predetermined individual optical fibers from predetermined optical fiber ribbons and splicing the thus broken out predetermined individual optical fibers. The remaining fibers in the optical fiber ribbon groups are also spliced. These steps are advantageously combined with the slack routing and organizing method steps described in the preceding paragraph. Thus, several major shortcomings of conventional splice organizers and methods are overcome by the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, applicants provide these embodiments so that this disclosure will be thorough and complete, and will fully convey the scope of the invention to those skilled in the art. Prime notation is used to identify to like elements of alternate embodiments.

Figure 1:
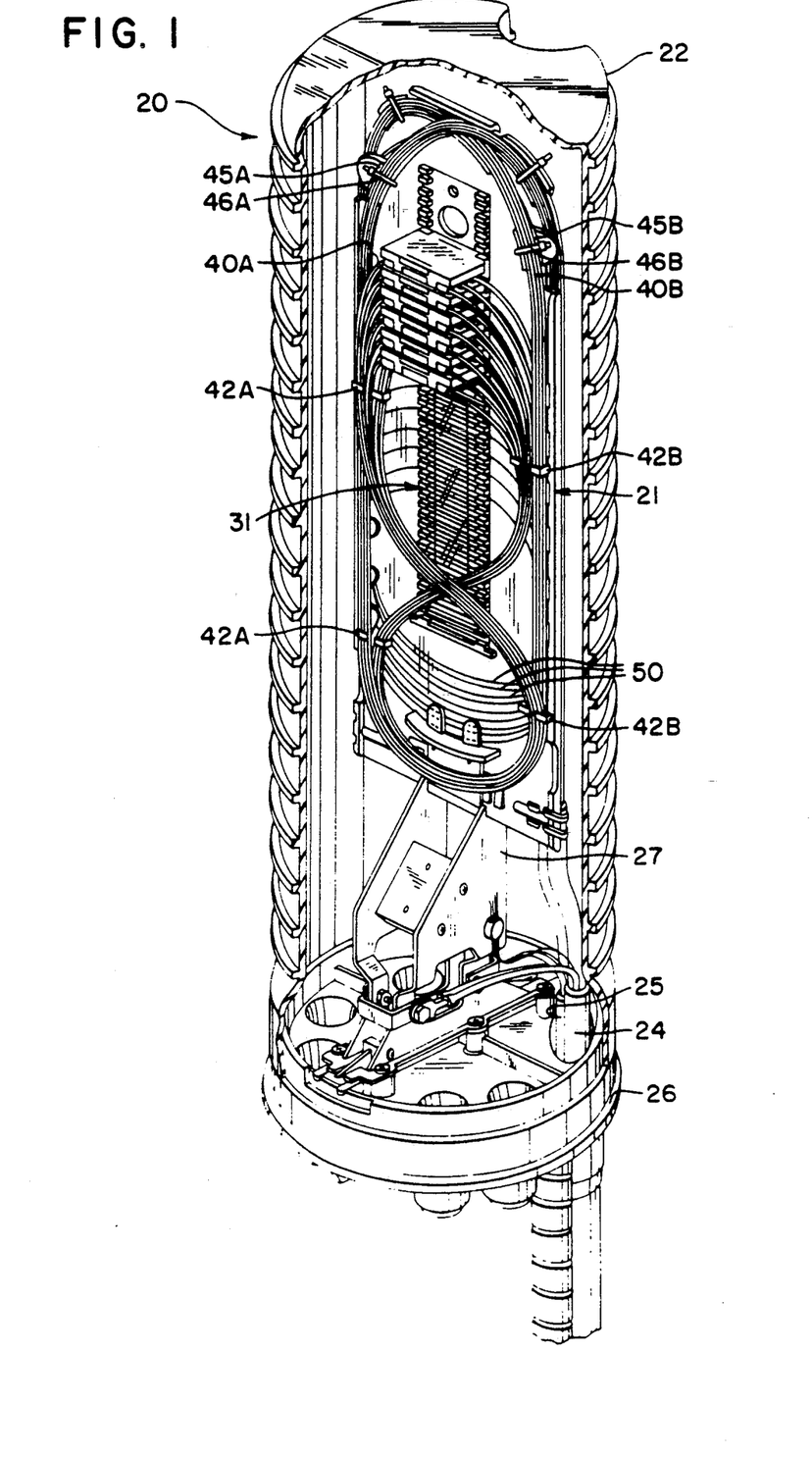
FIG. 1 is a fragmentary perspective view of an embodiment of a fiber optic splice organizer positioned within a fiber optic butt splice enclosure according to the present invention.

A completed fiber optic butt splice 20 is shown in FIG. 1 with the fiber optic splice organizer 21 according to the present invention shown installed within a protective housing 22. The fiber optic butt splice 20 includes portions of two fiber optic cables 24, 25 entering through an opening in an end cap 26 of the butt splice 20. The protective housing 22 is sealed to the end cap 26 after the splicing operation is completed. A mounting bracket 27 secures the splice organizer 21 to the end cap 26. The fiber optic butt splice 20 may be installed aerially along a pole line, in a manhole, direct buried in the ground, and in other locations as would be understood by those having skill in the art. As will also be readily appreciated by those skilled in the art the present invention is advantageously used in other splice configurations, such as an in-line splice wherein a pair of fiber optic cables enter the housing through respective opposing end caps.

Figure 2:
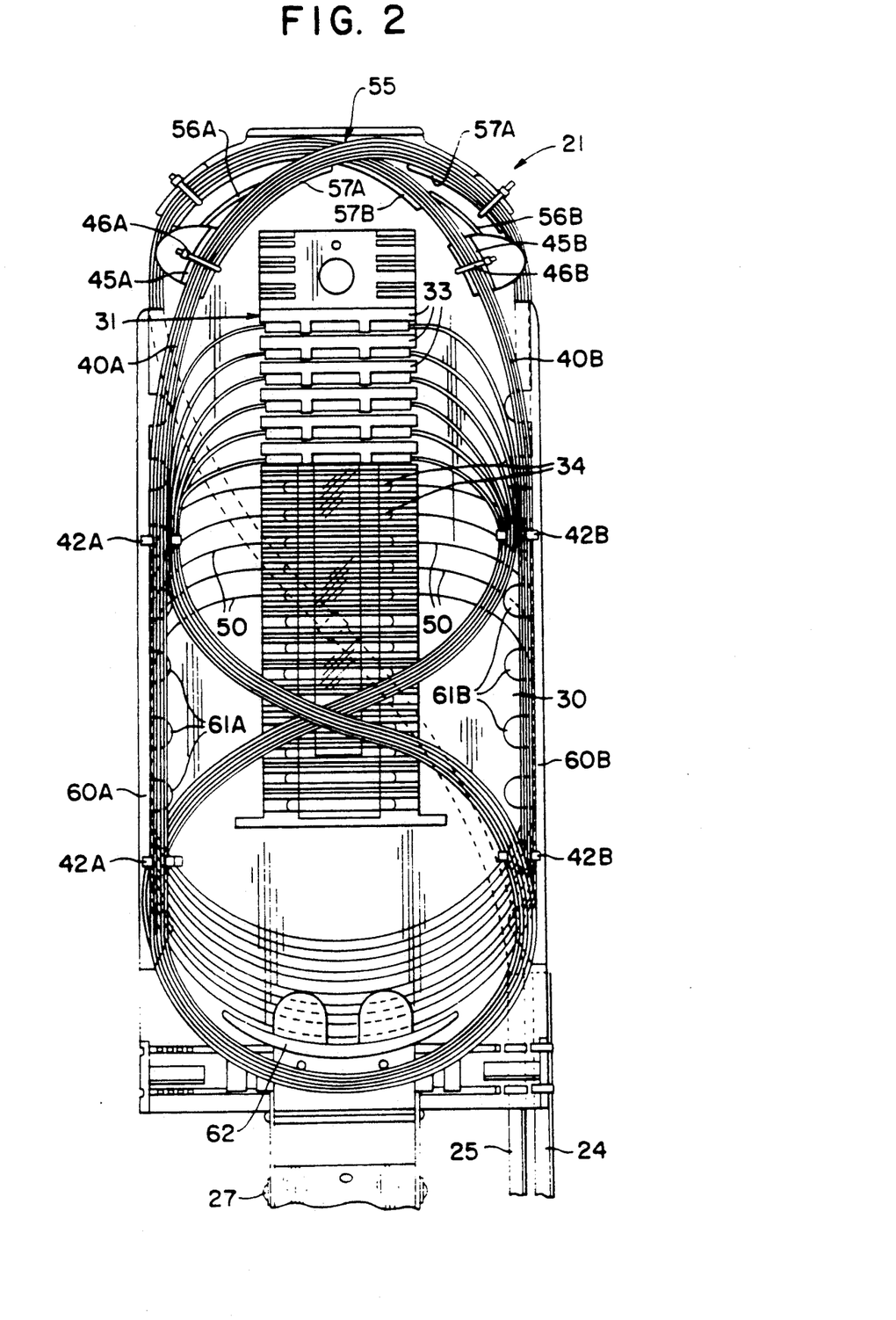
FIG. 2 is a plan view of the fiber optic splice organizer according to the invention as shown in FIG. 1.
Figure 3:
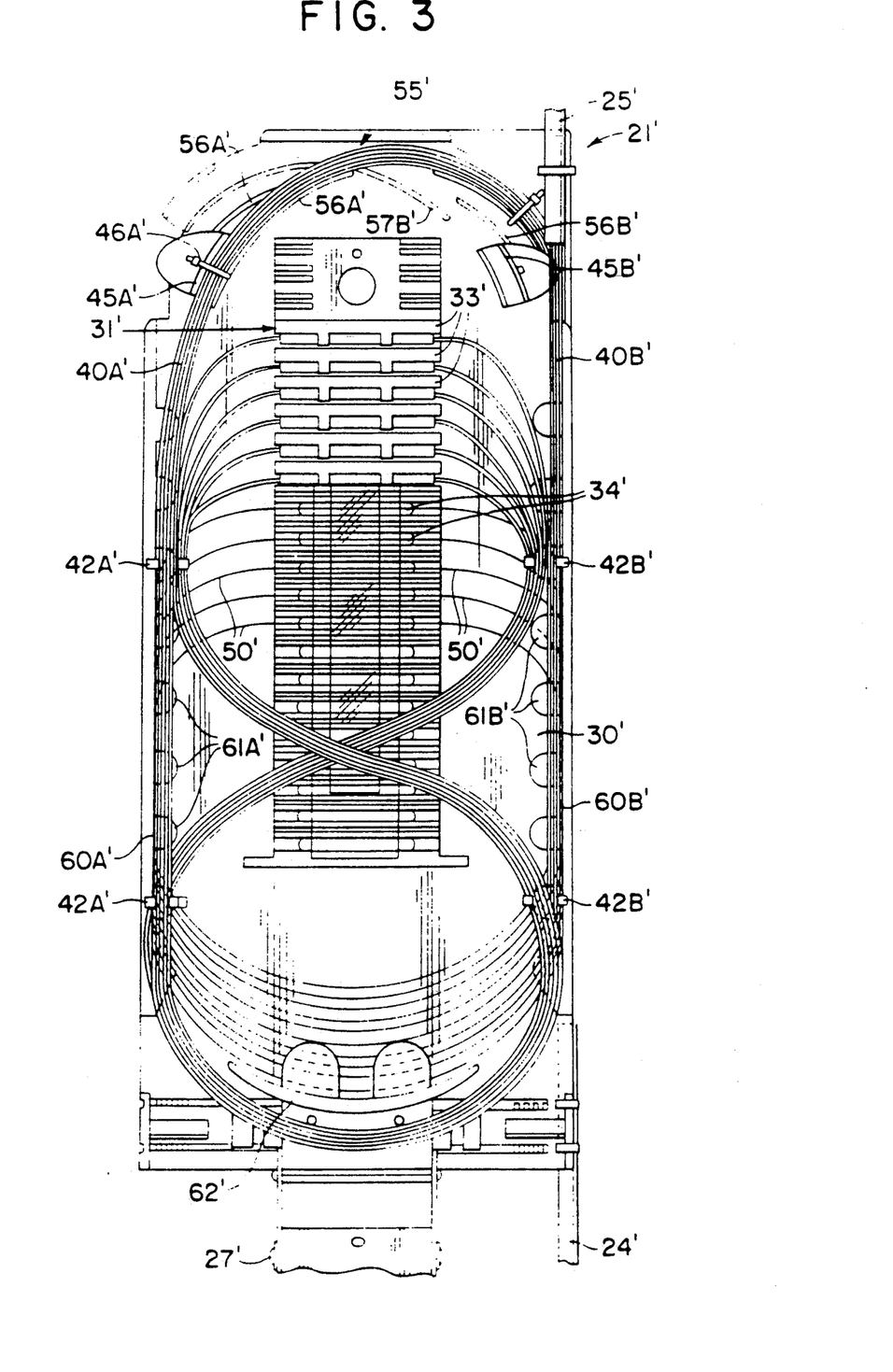
FIG. 3 is a plan view of another embodiment of a fiber optic splice organizer according to the present invention for use with an inline cable splice enclosure.

Referring first to FIGS. 2 and 3, the two embodiments of the splice organizer 21, 21' according to the invention are best understood. In FIG. 2 there is shown a splice organizer 21 for a butt-type splice wherein both fiber cables 24, 25 enter the splice enclosure 20 (FIG. 1) from one end cap 26. FIG. 3 shows an alternate embodiment of the splice organizer 21' for an in-line splice wherein two cables 24, 25 enter the splice enclosure 60 from opposing end caps and are thus secured to the splice organizer 21' at opposing first and second ends of the base 30'. In view of the similarity of the two embodiments shown in FIGS. 2 and 3, the following description will be directed to the embodiment shown in FIG. 2 for the butt-type splice; it being readily understood therefrom by those skilled in the art the operation of the in-line splice organizer shown in FIG. 3.

Letters A and B are used in the various drawing figures for clarity in describing the elements of the invention on first and second lengthwise extending sides, respectively, of the splice organizer 21. The splice organizer 21 includes a generally rectangular base 30 having lengthwise extending first and second opposing sides (A, B) and widthwise extending first and second opposing ends. The first end of the base 30 is defined as the end opposite from the mounting bracket 27 while the second end of the base is adjacent the mounting bracket. The base 30 is preferably made of a plastic material and is generally rectangular in shape. By generally rectangular is meant that the base 30 may be square, or may have rounded or cut-off corners and thus appear somewhat elliptical in shape.

Referring now to FIGS. 2-5, splice securing means 31 is positioned on a medial portion of the base between the first and second sides thereof and adjacent the first end of the base for securing a plurality of optical fiber splices 39, 34 on the base 30. As shown in the illustrated embodiment of FIG. 4, the splice securing means may be provided by a series of laterally spaced apart walls 35 extending upwardly from the base 30 and being integrally molded with the base to thereby define a series of widthwise extending slots for receiving optical fiber splices therein.

Figures 4, 5, 6, 7:
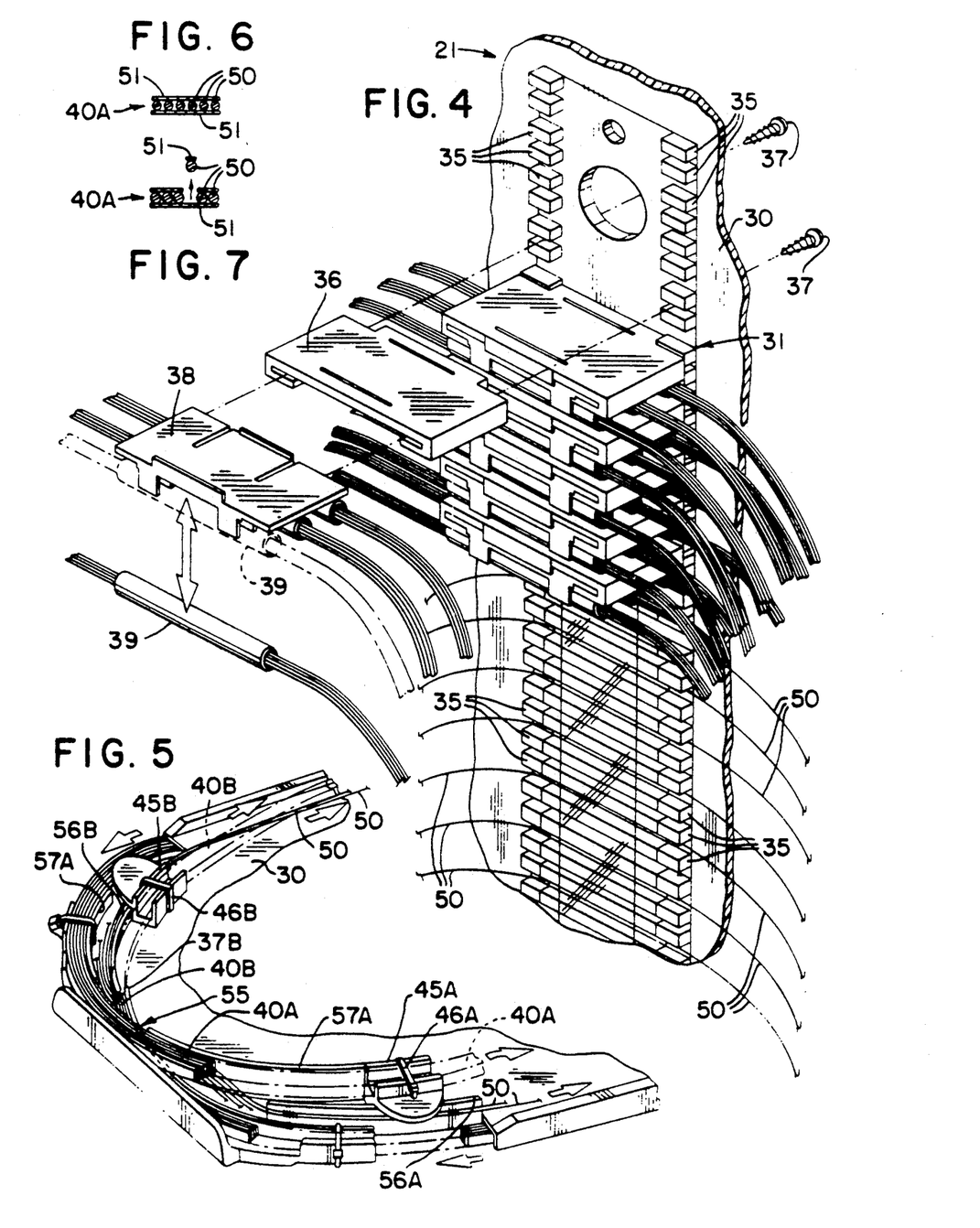
FIG. 4 is an exploded perspective view of a medial portion of the fiber optic splice organizer according to the invention as shown in FIG. 1 illustrating the mounting of splices onto the splice organizer.
FIG. 5 is a perspective view of an end portion of the fiber optic splice organizer according to the invention as shown in FIG. 1 illustrating the breakout of individual optical fibers from optical fiber ribbons.
FIGS. 6 and 7 are cross-sectional views of an optical fiber ribbon illustrating the breakout of an individual interior optical fiber from the optical fiber ribbon.

As shown best in the exploded view of FIG. 4, a conventional ribbon optical fiber splice holder 33 as used in the present invention includes a first clip 36 which is secured to the splice retaining means 31 by screws 37, and a second clip 38 which matingly engages the first clip 36 and also retains a plurality of individual ribbon optical fiber splices, each surrounded by a protective sleeve 39. The individual optical fiber splices 34 (FIGS. 2 and 4) are also of a conventional type, wherein the fiber ends are either mechanically held in alignment or fusion welded, and housed within protective sleeves, not shown.

The splice organizer 21 also includes slack guide means positioned on the base 30 for guiding respective slack portions of laterally spaced apart first and second optical fiber groups 40A, 40B from the first end of the base, along respective portions of the base adjacent the first and second sides thereof, into a plurality of overlying slack loops adjacent the second end of the base, and back to splice securing means 31 from respective first and second sides of the base. Accordingly, overlying respective slack loops of first and second optical fiber groups are readily separable from each other. This feature of the invention is achieved by the guide means in both the in-line splice embodiment of the invention shown in FIG. 3 and the butt splice embodiment illustrated in the other drawing figures.

As shown in the illustrated embodiment of FIG. 2, the slack guide means may be provided by first and second pairs of laterally spaced apart optical fiber guides 42A, 42B positioned adjacent respective first and second sides of the base 30. The first optical fiber guide of each pair is positioned on a medial portion of the base between the first and second ends thereof, and the second optical fiber guide of each pair is positioned adjacent the second end of the base. Each of optical fiber guides 42A, 42B is formed by a pair of opposing spaced apart walls extending upwardly from the base. To secure the respective optical fiber groups 40A, 40B within the optical fiber guides 42A, 42B, fasteners (not shown) may be used to close the open upper ends of the optical fiber guides 42A, 42B after splicing is completed, as would be readily understood by those skilled in the art.

Optical fiber group securing means is also positioned on the base adjacent the first end thereof for securing the first and second optical fiber groups 40A, 40B in laterally spaced apart relation on the base 31 upstream from the guide means and adjacent respective first and second sides of the base. The optical fiber group securing means includes a pair of laterally spaced apart optical fiber guides 45A, 45B and a pair of associated fasteners 46A, 46B.

Figure 8:
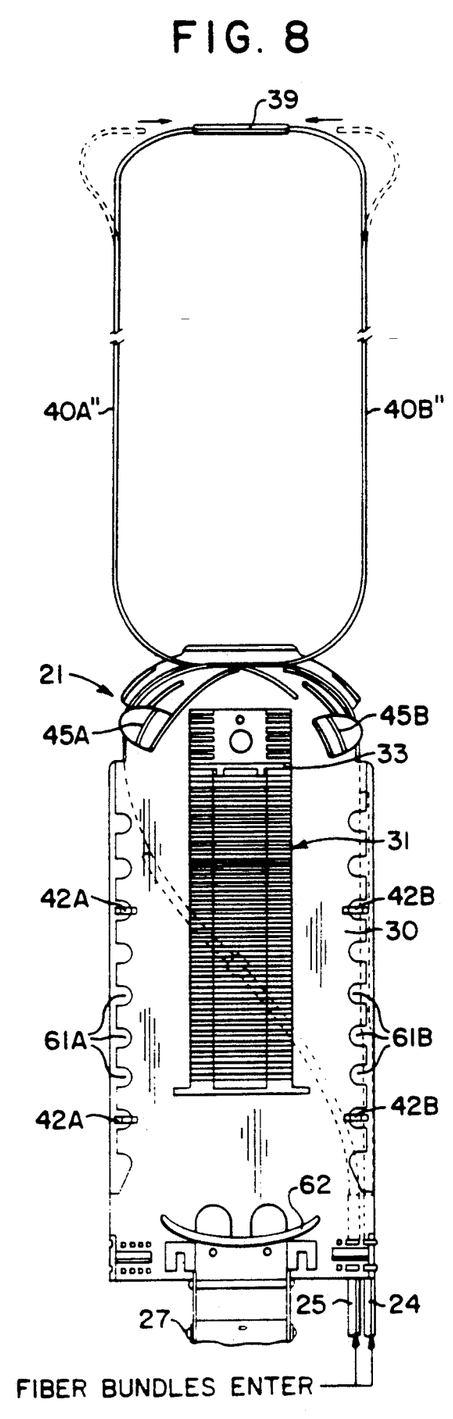
FIGS. 8 and 9 are plan views of the fiber optic splice organizer according to the invention as shown in FIG. 1 illustrating the method of organizing optical fiber splices and associated slack according to the present invention.

Referring now to FIGS. 8-11, the freedom from entanglement between fibers in the respective optical fiber ribbon groups 40A, 40B and ease of subsequent access obtained with the splice organizer 21 are best explained. FIG. 8 illustrates a conventional ribbon optical fiber splice and protective sleeve 39 after completion of the splice wherein an optical fiber ribbon 40A", 40B" from each optical fiber ribbon group 40A, 40B is shown routed away from the splice organizer 21 to the splicing location. The splicing location is typically a conventional splicing tool for precisely aligning the optical fiber ends and securing them in the aligned position. As would be readily understood by those skilled in the art, single optical fiber ribbons or individual optical fibers may be spliced and routed as shown in FIG. 8.

Figure 9:
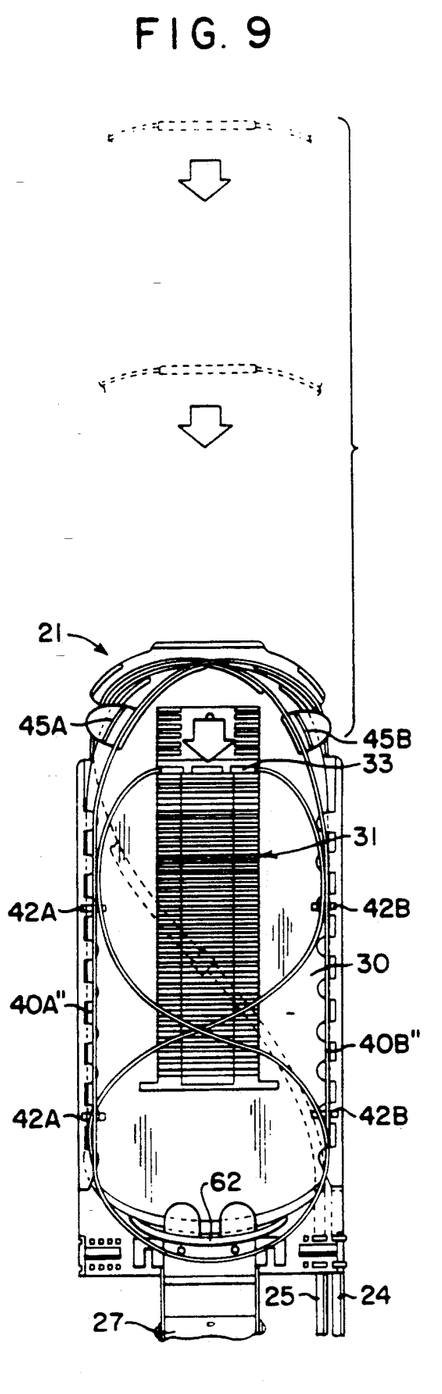

In FIG. 9, the slack optical fibers 40A", 40B" to the made splice and protective sleeve 39 are shown routed through the pairs of optical fiber guides 42A, 42B so as to form a pair of overlying slack loops adjacent the second end of the base 30. Each splice and protective sleeve 39, and the slack may thus be stored on the splice organizer 21 in a sequential fashion as shown in FIGS. 8 and 9 without any permanent entangling between the two optical fiber ribbon groups 40A, 40B.

Figure 10:
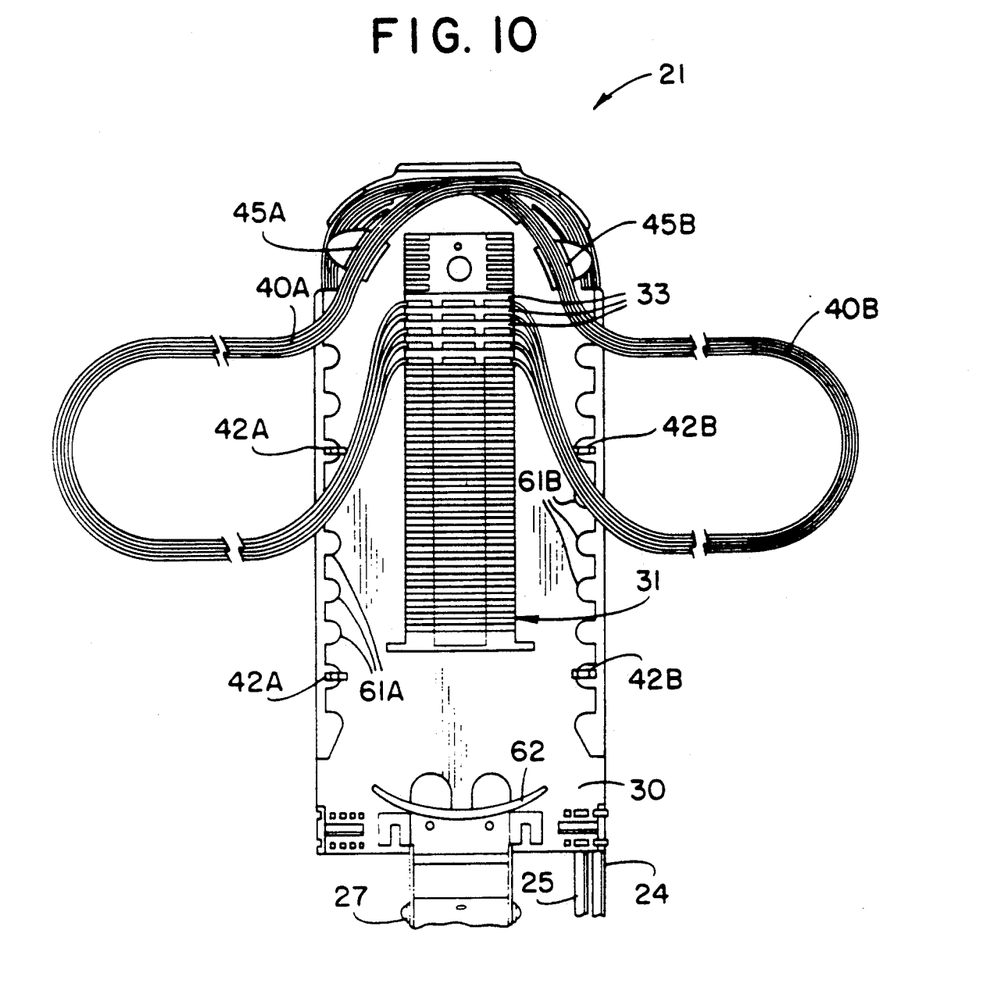
FIGS. 10 and 11 are plan views of the fiber optic splice organizer according to the present invention as shown in FIG. 1 with first and second groups of optical fibers removed from the organizer thereby illustrating the ready separability of the optical fiber groups, such as to remake an existing splice.
Figure 11:
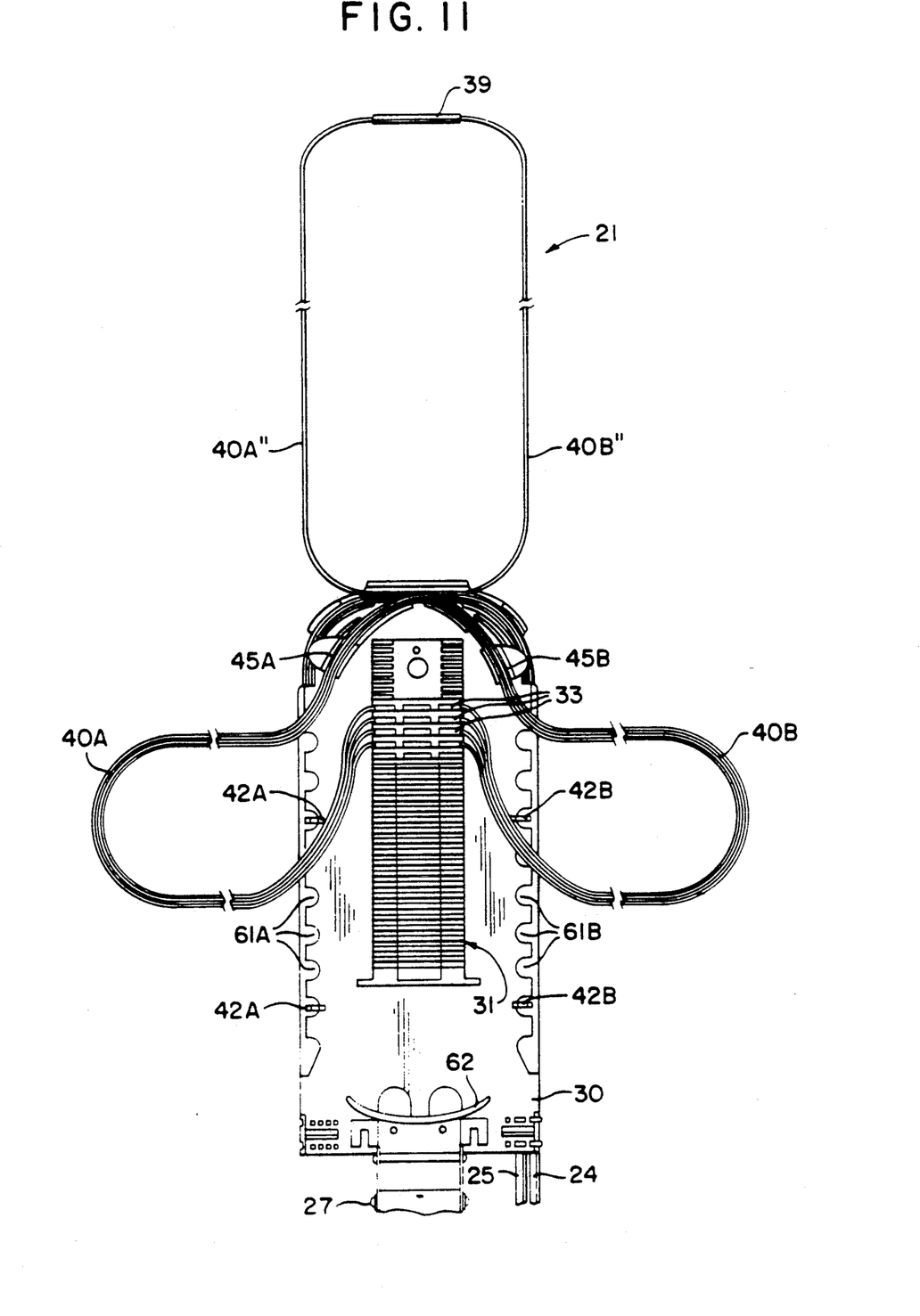

Referring to FIGS. 10 and 11, one method for accessing a made splice after all of the splices have been completed is shown. As shown in FIG. 10, the optical fiber ribbon groups 40A, 40B are readily removed from the pairs of optical fiber guides 42A, 42B leaving two separate slack loops. In FIG. 11, an individual splice and its protective sleeve 39 and its associated slack 40A", 40B" have been separated from the slack loops of FIG. 10, such as for remaking a bad splice. After completing the splice, the optical fiber ribbon groups 40A, 40B may then be repositioned within the optical fiber guides 42A, 42B. Thus, the present invention permits ready access to an individual splice even after all of the splices have been made and the slack secured on the splice organizer 21.

As would be readily understood by those having skill in the art, another method for repairing or remaking a bad splice would be to remove only the desired optical fiber ribbon 40A", 40B" from the optical fiber guides 42A, 42B. This subsequent separation and handling of a desired optical fiber ribbon is readily facilitated by the present invention because no permanent entanglement of the optical fiber ribbon groups or ribbons within each group occurs.

Another significant aspect of the present invention is the ability to break out individual optical fibers from optical fiber ribbons and store the splices for both, as well as the slack associated with both types of splices.

Referring again to FIGS. 1-2 and 4-7, the break out of individual optical fibers from optical fiber ribbons for the butt splice embodiment of the invention will be explained. FIGS. 6 and 7 show an optical fiber ribbon 40A" in cross-section and illustrate the removal of an interior optical fiber 50 from the side-by-side optical fibers secured together by an adhesive layer 51 surrounding the optical fibers as in a conventional ribbon cable of the type manufactured by AT&T.

As shown best in FIGS. 2 and 5, the splice organizer 21 includes breakout means positioned on the base 30 for securing the first and second optical fiber ribbon groups 40A, 40B on the base and for guiding predetermined individual optical fibers 50 broken out from optical fiber ribbons away therefrom for effecting splicing. The breakout means includes crossover means 51 positioned adjacent the first end of base 30 for guiding the first and second optical fiber ribbon groups 40A, 40B in a crossing relation to positions adjacent respective opposing sides of the base. The crossover means includes the optical fiber ribbon group securing means, that is, the pair of laterally spaced apart optical fiber ribbon guides 45A, 45B and their associated fasteners 46A, 46B as described above.

The breakout means further includes first and second arcuately shaped walls 56A, 56B positioned on the base 30 adjacent respective optical fiber ribbon guides 45A, 45B and extending upwardly from the base. Each of the first and second arcuately shaped walls has a predetermined radius of curvature for maintaining the individual optical fibers at a predetermined minimum bend radius. Third and fourth arcuately shaped walls 57A, 57B of the crossover means are also provided to guide the optical fiber ribbon groups 40A, 40B and maintain them at a sufficiently large predetermined bend radius.

Separator means is provided on the base 30 for maintaining the individual optical fibers 50 separate from the first and second optical fiber ribbon groups 40A, 40B downstream from the breakout means to thereby prevent entangling between the individual optical fibers and the optical fiber ribbon groups. The separator means includes first and second channels on the base 30 extending lengthwise adjacent respective first and second sides of the base for receiving therein slack portions of the individual optical fibers 50. The first and second channels are formed by respective lengthwise extending side walls 60A, 60B extending upwardly from the base 30 adjacent the first and second sides of the base and a series of laterally spaced apart tabs 61A, 61B connected to upper portions of the side walls 60A, 60B. The tabs 61A, 61B extend inwardly from respective first and second sides of the base to define the channels for receiving the individual optical fibers 50.

The separator means further includes a generally widthwise extending arcuately shaped wall 62 having a predetermined radius of curvature and extending upwardly from the base 30 adjacent the second end thereof. The individual optical fibers 50 are stored on the inside of the separator wall 62, while the optical fiber ribbon groups are stored on the outside of the separator wall.

Splice securing means for the individual optical fibers 50 is provided by the series of laterally spaced apart walls extending upwardly from a medial portion of the base as shown in FIG. 4.

As would be readily understood by those skilled in the art, an in-line splice according to the invention may also include breakout means for separating out individual optical fibers from the optical fiber ribbon groups 40A, 40B. An in-line arrangement, however, would not require the crossover means as described for the butt-type splice. The separator means and the splice securing means for the in-line splice may be similar to that for the butt-type splice 20.

In view of the foregoing description of the splice organizer 21 according to the invention, the method aspects of the present invention will be readily understood. A method for organizing a plurality of optical fiber splices between first and second optical fiber groups 40A, 40B according to the invention includes the steps of guiding and securing respective slack portions of the first and second optical fiber groups from the first end of the base 30, along respective portions of the base adjacent the first and second sides thereof, into a plurality of overlying slack loops adjacent the second end of said base, and back to adjacent the first end of the base from respective first and second sides of the base. Accordingly, overlying respective slack loops of the first and second optical fiber groups 40A, 40B are readily separable from each other. The optical fiber splices are then secured on a medial portion of the base 30 adjacent the first end thereof. Preferably, the first and second optical fiber groups 40A, 40B are secured to the base in laterally spaced apart relation prior to splicing.

Another method aspect according to the present invention for splicing first and second optical fiber ribbon groups includes the steps of breaking out predetermined individual optical fibers from predetermined optical fiber ribbons and splicing the thus broken out predetermined individual optical fibers. In addition, the remaining optical fibers in the first and second optical fiber ribbon groups are also spliced. This method of separating out individual optical fibers from optical fiber ribbons is advantageously combined with the method for organizing first and second groups of optical fibers to provide ready separability.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fiber optic splice organizer for securing a plurality of optical fiber splices between first and second optical fiber groups and for securing slack associated therewith, said splice organizer comprising:
a generally rectangular base having lengthwise extending first and second opposing sides and widthwise extending first and second opposing ends;
splice securing means positioned on a medial portion of said base between the first and second sides thereof and adjacent the first end of said base for securing a plurality of optical fiber splices on said base; and
slack guide means positioned on said base for guiding respective slack portions of laterally spaced apart first and second optical fiber groups from the first end of said base, along respective portions of said base adjacent the first and second sides thereof, into a plurality of respective first and second slack loops overlying each other adjacent the second end of said base, and back to said splice securing means from respective first and second sides of said base so that the overlying respective slack loops of the first and second optical fiber groups are readily separable from each other.

2. A fiber optic slice organizer according to claim 1 wherein said slack guide means comprises first and second pairs of laterally spaced apart optical fiber guides positioned adjacent respective first and second sides of said base.

3. A fiber optic splice organizer according to claim 2 wherein each of said first and second pairs of optical fiber guides comprises first and second optical fiber guides; wherein the first optical fiber guide of each pair of optical fiber guides is positioned on a medial portion of said base between the first and second ends thereof; and wherein the second optical fiber guide of each pair of optical fiber guides is positioned adjacent the second end of said base.

4. A fiber optic splice organizer according to claim 2 wherein each of said optical fiber guides comprises a pair of opposing spaced apart walls extending upwardly from said base.

5. A fiber optic splice organizer according to claim 1 further comprising optical fiber group securing means positioned on said base adjacent the first end thereof for securing first and second optical fiber groups in laterally spaced apart relation on said base upstream from said guide means and adjacent respective first and second sides of said base.

6. A fiber optic splice organizer according to claim 5 wherein said optical fiber group securing means comprises a pair of laterally spaced apart optical fiber guides and a pair of fasteners associated therewith for securing first and second optical fiber groups in respective optical fiber guides.

7. A fiber optic splice organizer according to claim 6 wherein said splice securing means and said slack guide means are positioned on a first surface of said base; and wherein said optical fiber group securing means further comprises means for securing first and second optical fiber groups to said base on a second surface of said base opposite said first surface.

8. A fiber optic splice organizer according to claim 1 wherein said splice securing means comprises a series of laterally spaced apart walls extending upwardly from said base and defining a series of widthwise extending slots for receiving optical fiber splices therein.

9. A fiber optic splice organizer for securing a plurality of optical fiber ribbon splices between first and second optical fiber ribbon groups, and for securing individual optical fiber splices between predetermined individual optical fibers broken out from the optical fiber ribbons, said splice organizer comprising:
a base;
splice securing means positioned on said base for securing both a plurality of optical fiber ribbon splices and a plurality of individual optical fiber splices on said base; and
breakout means positioned on said base for securing first and second optical fiber ribbon groups on said base and for guiding predetermined individual optical fibers broken out from optical fiber ribbons away therefrom for effecting splicing of predetermined individual optical fibers.

10. A fiber optic splice organizer according to claim 9 wherein said base is generally rectangular in shape having lengthwise extending first and second opposing sides and widthwise extending first and second opposing ends.

11. A fiber optic splice organizer according to claim 10 wherein said breakout means comprises crossover means positioned adjacent the first end of said base for guiding first and second optical fiber ribbon groups in a crossing relation to positions adjacent respective opposing sides of said base.

12. A fiber optic splice organizer according to claim 11 wherein said crossover means further comprises optical fiber ribbon group securing means positioned on said base adjacent the first end thereof for securing first and second optical fiber ribbon groups in laterally spaced apart relation on said base and adjacent respective first and second sides of said base.

13. A fiber optic splice organizer according to claim 12 wherein said optical fiber ribbon group securing means comprises a pair of laterally spaced apart optical fiber ribbon guides and a pair of fasteners associated with said pair of optical fiber ribbon guides for securing first and second optical fiber ribbon groups in respective optical fiber ribbon guides.

14. A fiber optic splice organizer according to claim 13 wherein said breakout means further comprises first and second arcuately shaped walls positioned on said base adjacent respective optical fiber ribbon guides of said optical fiber ribbon group securing means and extending upwardly from said base; and wherein each of said first and second arcuately shaped walls has a predetermined radius of curvature for maintaining predetermined individual optical fibers at a predetermined minimum bend radius.

15. A fiber optic splice organizer according to claim 10 further comprising separator means for maintaining predetermined individual optical fibers separate from first and second optical fiber ribbon groups downstream from said breakout means to prevent entangling therewith.

16. A fiber optic splice organizer according to claim 15 wherein said separator means comprises first and second channels on said base extending lengthwise adjacent respective first and second sides of said base for receiving therein slack portions of predetermined individual optical fibers.

17. A fiber optic splice organizer according to claim 16 wherein said first and second channels comprise respective lengthwise extending side walls extending upwardly from said base adjacent first and second sides of said base and a series of laterally spaced apart tabs connected to upper portions of said side walls and extending inwardly from respective first and second sides of said base.

18. A fiber optic splice organizer according to claim 15 wherein said separator means comprises a generally widthwise extending arcuately shaped wall having a predetermined radius of curvature and extending upwardly from said base adjacent the second end thereof.

19. A fiber optic splice organizer according to claim 9 wherein said splice securing means comprises a series of laterally spaced apart walls extending upwardly from said base adjacent the first end thereof and defining a series of widthwise extending slots for receiving both optical fiber ribbon splices and individual optical fiber splices therein.

20. A fiber optic splice organizer for securing a plurality of optical fiber ribbon splices between first and second optical fiber ribbon groups, for securing individual optical fiber splices between predetermined individual optical fibers broken out from the optical fiber ribbons, and for securing slack associated with both the optical fiber ribbon splices and the individual optical fiber splices, said splice organizer comprising:

a generally rectangular base having lengthwise extending first and second opposing sides and widthwise extending first and second opposing ends;

splice securing means positioned on a medial portion of said base between the first and second sides thereof and adjacent the first end of said base for securing a plurality of optical fiber ribbon splices on said base;

breakout means positioned on said base for securing first and second optical fiber ribbon groups on said base and for guiding predetermined individual optical fibers broken out from optical fiber ribbons away therefrom for effecting splicing of predetermined individual optical fibers; and slack guide means positioned on said base for guiding respective slack portions of laterally spaced apart first and second optical fiber groups from the first end of said base, along respective portions of said base adjacent the first and second sides thereof, into a plurality of respective first and second slack loops overlying each other adjacent the second end of said base, and back to said splice securing means from respective first and second sides of said base so that the overlying respective slack loops of the first and second optical fiber groups are readily separable from each other.

21. A fiber optic splice organizer according to claim 20 wherein said slack guide means comprises first and second pairs of laterally spaced apart optical fiber guides positioned adjacent respective first and second sides of said base.

22. A fiber optic splice organizer according to claim 21 wherein each of said first and second pairs of optical fiber guides comprises first and second optical fiber guides; wherein the first optical fiber guide of each pair of optical fiber guides is positioned on a medial portion of said base between the first and second ends thereof; and wherein the second optical fiber guide of each pair of optical fiber guides is positioned adjacent the second end of said base.

23. A fiber optic splice organizer according to claim 20 wherein said breakout means comprises crossover means positioned adjacent the first end of said base for guiding first and second optical fiber ribbon groups in a crossing relation to positions adjacent respective opposing sides of said base.

24. A fiber optic splice organizer according to claim 23 wherein said crossover means further comprises optical fiber ribbon group securing means positioned on said base adjacent the first end thereof for securing first and second optical fiber ribbon groups in laterally spaced apart relation on said base and adjacent respective first and second sides of said base.

25. A fiber optic splice organizer according to claim 24 wherein said optical fiber ribbon group securing means comprises a pair of laterally spaced apart optical fiber ribbon guides and a pair of fasteners associated with said pair of optical fiber ribbon guides for securing first and second optical fiber ribbon groups in respective optical fiber ribbon guides.

26. A fiber optic splice organizer according to claim 25 wherein said breakout means further comprises first and second arcuately shaped walls positioned on said base adjacent respective optical fiber ribbon guides of said optical fiber ribbon group securing means and extending upwardly from said base; and wherein each of said first and second arcuately shaped walls has a predetermined radius of curvature for maintaining predetermined individual optical fibers at a predetermined minimum bend radius.

27. A fiber optic splice organizer according to claim 20 further comprising separator means for maintaining predetermined individual optical fibers separate from first and second optical fiber ribbon groups downstream from said breakout means.

28. A fiber optic splice organizer according to claim 27 wherein said separator means comprises first and second channels on said base extending lengthwise adjacent respective first and second sides of said base for receiving therein slack portions of predetermined individual optical fibers.

29. A fiber optic splice organizer according to claim 28 wherein said first and second channels comprise respective lengthwise extending side walls extending upwardly from said base adjacent first and second sides of said base and a series of laterally spaced apart tabs connected to upper portions of said side walls and extending inwardly from respective first and second sides of said base.

30. A fiber optic splice organizer according to claim 27 wherein said separator means comprises a generally widthwise extending arcuately shaped wall having a predetermined radius of curvature and extending upwardly from said base adjacent the second end thereof.

31. A fiber optic splice organizer according to claim 20 wherein said splice securing means comprises a series of laterally spaced apart walls extending upwardly from said base adjacent the first end thereof and defining a series of widthwise extending slots for receiving both optical fiber ribbon splices and individual optical fiber splices therein.

32. A method for organizing a plurality of optical fiber splices between first and second optical fiber groups and slack associated therewith on a generally rectangular base having lengthwise extending first and second opposing sides and widthwise extending first and second opposing ends, the method comprising the steps of:

guiding and securing respective slack portions of first and second optical fiber groups from the first end of the base, along respective portions of the base adjacent the first and second sides thereof, into a plurality of respective first and second slack loops overlying each other adjacent the second end of said base, and back to adjacent the first end of the base from respective first and second sides of the base so that the overlying respective slack loops of the first and second optical fiber groups are readily separable from each other; and securing the optical fiber splices between the first and second optical fiber groups on a medial portion of the base adjacent the first end thereof.

33. A method according to claim 32 further comprising the step of securing the first and second optical fiber groups in laterally spaced apart relation on the base adjacent the first end of the base prior to splicing.

34. A method according to claim 32 wherein each of the optical fiber groups comprises optical fiber ribbons and further comprising the steps of breaking out predetermined individual optical fibers from predetermined optical fiber ribbons; and splicing the thus broken out predetermined individual optical fibers.

* * * * *